United States Patent
Naqi et al.

(10) Patent No.: US 8,888,639 B2
(45) Date of Patent: Nov. 18, 2014

(54) METHOD FOR PROVIDING A CONTROLLED NEUTRAL IN LIEU OF A CONVENTIONAL NEUTRAL IN AN ELECTRO-MECHANICAL TRANSMISSION

(71) Applicant: GM Global Technology Operations LLC, Detroit, MI (US)

(72) Inventors: Syed Naqi, Dearborn, MI (US); Lawrence A. Kaminsky, White Lake, MI (US); Jy-Jen F. Sah, West Bloomfield, MI (US); Shaun C. Bowman, Ann Arbor, MI (US); Christopher A. Laurent, Lake Orion, MI (US); George Robison, Bloomfield Hills, MI (US); Silva Hiti, Redondo Beach, CA (US); Jonathan M. Bolenbaugh, Ann Arbor, MI (US); Ali K. Naqvi, White Lake, MI (US); Sasa Lucic, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 117 days.

(21) Appl. No.: 13/679,460

(22) Filed: Nov. 16, 2012

(65) Prior Publication Data

US 2014/0141915 A1 May 22, 2014

(51) Int. Cl.
*F16H 3/72* (2006.01)
*B60W 10/06* (2006.01)
*B60W 10/08* (2006.01)
*F16H 37/06* (2006.01)

(52) U.S. Cl.
CPC .................................... *F16H 37/065* (2013.01)
USPC .................................. 475/5; 477/3; 477/111

(58) Field of Classification Search
CPC ......... F16H 3/72; F16H 59/70; F16H 61/682; B60W 10/06; B60W 10/08; B60W 10/115; B60W 20/30
USPC ............... 475/5; 477/3, 5, 108, 110, 111, 113
See application file for complete search history.

(56) References Cited

U.S. PATENT DOCUMENTS

| | | | |
|---|---|---|---|
| 2009/0093330 A1* | 4/2009 | Kumazaki et al. | 475/5 |
| 2009/0118931 A1* | 5/2009 | Kaminsky et al. | 701/54 |
| 2009/0203495 A1* | 8/2009 | Muta et al. | 477/3 |
| 2010/0093477 A1* | 4/2010 | Foster et al. | 475/116 |

OTHER PUBLICATIONS

U.S. Appl. No. 13/645,798, filed Oct. 5, 2012.

* cited by examiner

*Primary Examiner* — Edwin A Young

(57) ABSTRACT

A powertrain system includes an internal combustion engine, a first electric machine and an electro-mechanical transmission operative to transmit torque to a driveline. A method for controlling the powertrain system in the presence of a controlled neutral operation of the electro-mechanical transmission being selected includes monitoring vehicle speed, and only when the monitored vehicle speed is indicative of a low-speed zone restricting a transition from a current engine operating state.

20 Claims, 4 Drawing Sheets

METHOD FOR PROVIDING A CONTROLLED NEUTRAL IN LIEU OF A CONVENTIONAL NEUTRAL IN AN ELECTRO-MECHANICAL TRANSMISSION

TECHNICAL FIELD

This disclosure is related to powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, drivability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

It is known to shutdown hybrid powertrain systems after a short period of time during neutral operation when the hybrid powertrain system lacks a conventional mechanical neutral (i.e., mechanical decoupling the driveline from the transmission) in order to prevent undesirable and unintended vehicle motion in the presence of a torque error due to de-magnetization of the electric machines, part-to-part variation within the hybrid powertrain system and/or one of a class of anomalies in the electric machines. However, shutdown of the hybrid powertrain system can result in lost functionality of the vehicle such as the desirability to utilize auxiliary components of the vehicle.

SUMMARY

A powertrain system includes an internal combustion engine, a first electric machine and an electro-mechanical transmission operative to transmit torque to a driveline. A method for controlling the powertrain system in the presence of a controlled neutral operation of the electro-mechanical transmission being selected includes monitoring vehicle speed, and only when the monitored vehicle speed is indicative of a low-speed zone restricting a transition from a current engine operating state.

BRIEF DESCRIPTION OF THE DRAWINGS

One or more embodiments will now be described, by way of example, with reference to the accompanying drawings, in which:

FIGS. 3-1, 3-2 and 3-3 illustrate lever diagrams including a portion of a transmission for the powertrain system of FIG. 1 in the presence of a controlled neutral operation being selected, in accordance with the present disclosure.

DETAILED DESCRIPTION

Figure 1:
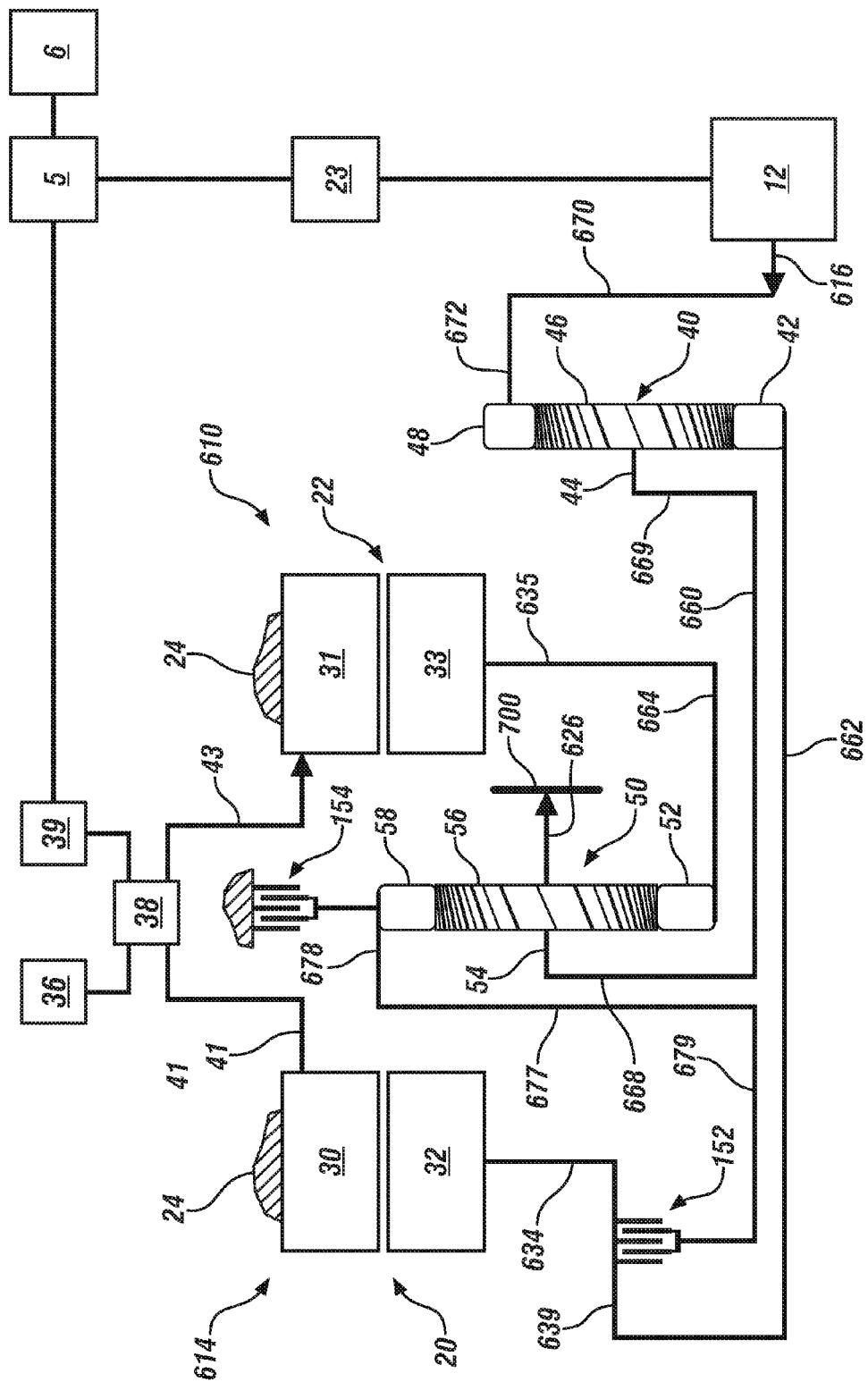
FIG. 1 illustrates a powertrain system having an internal combustion engine drivingly connected with an electro-mechanical transmission, a driveline, and a controller, in accordance with the present disclosure.

Referring now to the drawings, wherein the showings are for the purpose of illustrating certain exemplary embodiments only and not for the purpose of limiting the same, FIG. 1 illustrates a powertrain 610 having an internal combustion engine 12 drivingly connected with a electro-mechanical transmission 614. An output member of the engine 12 is connected for driving an input member 616 of the transmission 614.

A first electric machine 20 and a second electric machine 22 are packaged within a case housing/ground 24 and are operatively connected between the input member 616 and a transmission output member 626 that reacts with a driveline 700. The first electric machine 20 includes an annular stator 30 grounded to the transmission casing 24, an annular rotor 32 supported on and for rotation with a rotatable rotor hub 634. A high-voltage electrical energy storage device, e.g., a battery 36, power inverter 38 and electronic controller 39 are operatively connected with the stator 30 via transfer conductor 41 to control the functioning of the first electric machine 20 as a motor in which stored electrical energy is provided by the battery 36 to the stator 30 or the electrical energy can be sourced through the road when the second electric machine 22 is acting as a generator, and a generator in which torque of the rotating rotor 32 is converted to electrical power stored in the battery 36 or used by the second electric machine.

Similarly, the second electric machine 22 includes an annular stator 31 grounded to the transmission casing 24, an annular rotor 33 supported on a rotatable rotor rub 635. The battery 36, power inverter 38 and electronic controller 39 are operatively connected with the stator 31 via transfer conductor 43 to control the functioning of the second electric machine 22 as a motor and a generator.

The transmission 614 further includes first and second planetary gear sets 40, 50, respectively. Planetary gear set 40 has a first member that is a sun gear 42, a second member that is a carrier member 44 that rotatably supports a plurality of pinion gears 46 meshing with the sun gear 42, and a third member that is a ring gear 48 meshing with the pinion gears 46.

Planetary gear set 50 has a first member which is a sun gear 52, a second member that is a carrier member 54 that rotatably supports a plurality of pinion gears 56 meshing with the sun gear 52, and a third member that is a ring gear 58 meshing with the pinion gears 56. Rotor hub 635 is connected for rotation with the sun gear 52 by intermediate sleeve shaft 664.

The transmission 614 includes a first clutch 154 and a second clutch 152. The first clutch 154, also referred to as a grounding clutch or brake, is selectively activated to ground the ring gear member 58 to the transmission casing 24. The input member 616 is axially spaced from and not concentric with shaft 660, which couples the carrier member 44 of the first planetary gear set 40 and the carrier member 54 of the second planetary gear set 50. Shaft 672 is coaxial with the input member 616. Input member 616 couples to hub member 670 and axially-extending portion 672 to couple the input member 616 for common rotation with the ring gear 48. Shaft 662 couples rotor hub 634 with sun gear 42 via hub member 637 and an axially-extending portion 639. The second clutch 152 is nested between an axially extending portion 639, a hub 637 and a shaft. A hub member 677 is connected with the second clutch 152. A separate sleeve shaft 660 concentric with shaft 662 couples carrier member 54 and hub member 668 and 669 to carrier member 44. Sleeve shaft 664 couples rotor hub 635 with sun gear 52. Axially-extending member 678, hub 677 and axially-extending member 679, which is an annular shaft, couples the second clutch 152 with the first clutch 154 and ring gear 58. Axial-extending member 678 circumscribes the planetary gear set 50. It will be appreciated that the ring gear member 58 is decoupled from the sun gear member 42 when the second clutch 152 is deactivated.

An engine control module (ECM) 23 is operatively connected to the engine 12, and functions to acquire data from sensors and control actuators of the engine 12 over a plurality of discrete lines. The ECM 23 monitors an actual engine input torque, $T_1$, provided to the transmission 614 at that point in time based upon monitored engine speed and load, which is communicated to a hybrid control module (HCP) 5. The electronic controller 39 monitors a first motor torque of the first electric machine 20 and a second motor torque of the second electric machine 22. Alternatively, two electronic controllers can be utilized, each controller monitoring respective ones of the first and second electric machines 20, 22, respectively. The HCP 5 provides supervisory control over the ECM 23 and the electronic controller 39 and a gear selector lever 6 which is operatively connected to receive inputs from a vehicle operator. The HCP 5 can further control activation and deactivation of the first and second clutches 154, 152, respectively. The HCP 5 may coordinate torque commands among the engine 12 and the first and second electric machines 20, 22, respectively, to establish a net zero output torque condition during control neutral operation of the transmission 614 in response to an operator input to the gear selector lever 6.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
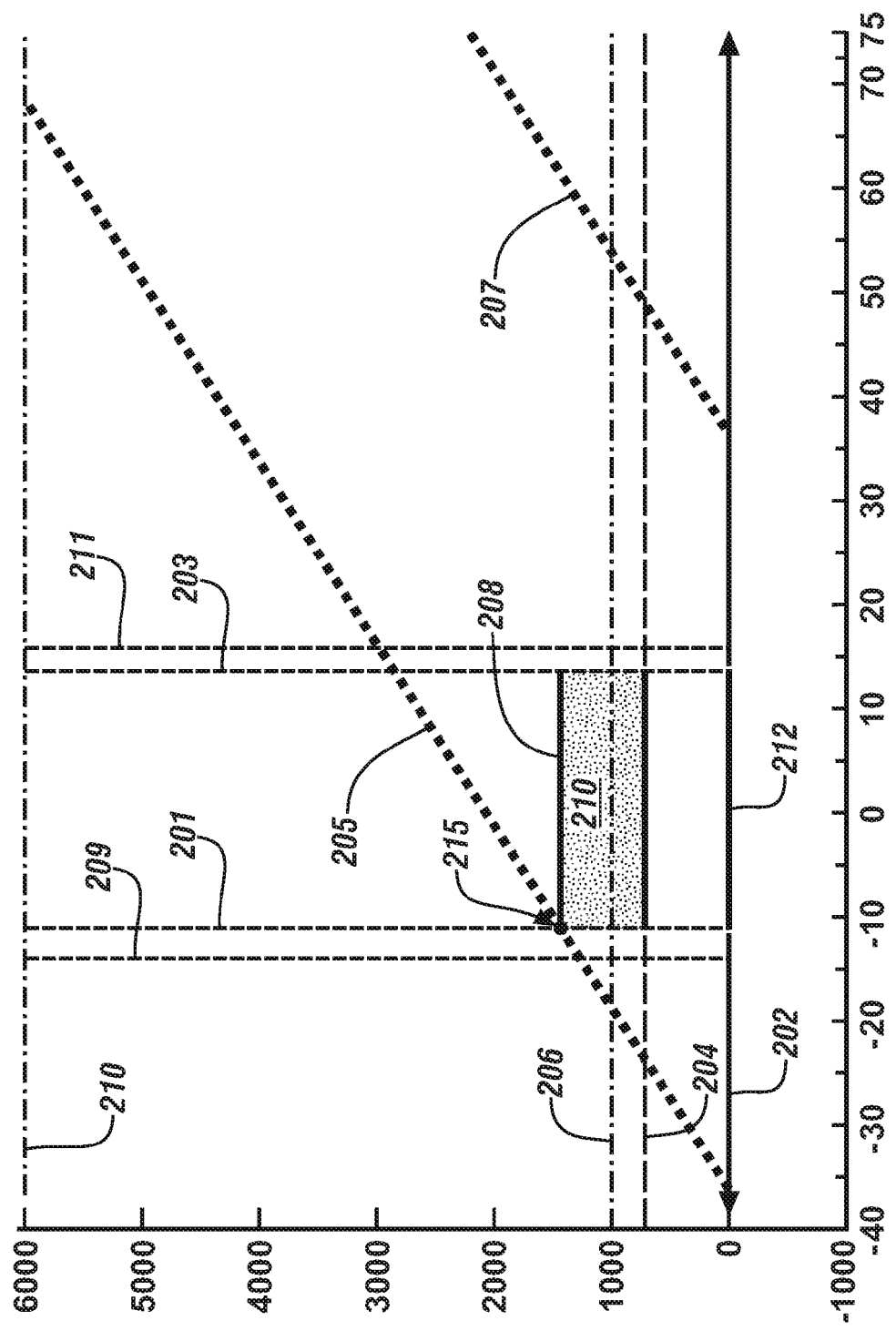
FIG. 2 illustrates a plot of engine speed versus vehicle speed including first and second low-speed zones when a controlled neutral operation of the transmission of FIG. 1 is selected, in accordance with the present disclosure.

FIG. 2 illustrates a plot of engine speed versus vehicle speed including first and second low-speed zones 210, 212, respectively, when a controlled neutral operation of the transmission 614 of FIG. 1 is selected, in accordance with the present disclosure. The horizontal axis denotes vehicle speed (MPH) and the vertical axis denotes engine speed (RPM). A first horizontal line 202 denotes an engine OFF state corresponding to an engine speed of zero RPM. A second horizontal line 204 denotes a minimum engine idle speed, e.g., 700 RPM. A third horizontal line 206 denotes a desired engine idle speed, e.g., 1,000 RPM. A first dashed oriented line 205 denotes a maximum uncontrolled generation limit for the first electric machine 20. A second dashed oriented line 207 denotes a minimum uncontrolled generation limit for the first electric machine 20. It will be understood that rotation of the driveline 700 occurs when the vehicle is in motion. Due to the mechanical coupling between the first electric machine 20 and the driveline 700, rotation of the driveline 700 will react with the first electric machine 20 causing the first electric machine 20 to spin. If the first electric machine is allowed to spin while deactivated, this may result in uncontrolled generation of electrical energy that may not be desirable for the battery 36 to accept. For instance, the battery 36 may be incapable of accepting any electrical energy because the battery 36 is already at a full state of charge. Accordingly, any uncontrolled generation of electrical energy outside the minimum and maximum uncontrolled generation limits, e.g., first and second dashed oriented lines 205, 207, respectively, is undesirable.

The transmission 614 of FIG. 1 lacks the ability to perform a conventional mechanical neutral by mechanically decoupling the driveline 700 from the transmission to prevent torque from being distributed to the driveline 700. Instead, the transmission 614 requires a controlled neutral operation when a vehicle operator selects a neutral gear state on the gear selector lever 6. The controlled neutral operation requires a net zero output torque condition at the output member 626 to meet a driver expectation of no self propelled movement of the vehicle while the neutral gear state is selected. The output member 626 always rotates at the same speed as the carrier member 54. Any net output torque at the output member 626 reacting with the driveline 700 that exceeds a motionless driveline threshold, violates the net zero output torque condition. Torque commands among the plurality of torque generative devices including the engine 12 and the first and second electric machines 20, 22, respectively, are coordinated and balanced in order to establish the net zero output torque condition. The coordination and balancing among the plurality of torque generative devices is advantageous to perform functions such as engine starting/stopping events, providing the operator the ability to request output torque and output speed, and charging of the battery 36 while auxiliary components such as air-conditioning are being operated.

However, a possibility of violating the net zero output torque condition can occur when sources of error in the generation of torque from the electric machines 20 and 22 exist due to de-magnetization, part-to-part variation, and a class of anomalies in the electric machines. It is understood that electric machines can become de-magnetized when exposed to heat over time, and thus, may become incapable of accurately meeting motor torque commands due to aging. If an electrical machine is incapable of accurately meeting a motor torque command, miss-production of torque can be distributed to the transmission resulting in unbalanced torques among the plurality of torque generative devices. The possibility of violating the net zero output torque condition is increased when torques among the plurality of torque generative devices become unbalanced. Violating the net zero output torque condition will result in unintended torque applied to the driveline 700, undesirably resulting in propelled motion of the vehicle. To mitigate the possibility of violating the net zero output torque condition in the presence of a controlled neutral operation of the transmission being selected, the first and second low-speed zones 210, 212, respectively, define regions of vehicle speeds where transitions from a current engine operating state are restricted. Further, and discussed in greater detail below, if the current engine operating state includes an engine ON state (e.g., first low-speed zone 210), motor torque output from at least the first electric machine 20 is limited to zero. The low-speed zones 210 and 212 are intended to encompass speeds where an operator of the vehicle would most likely perceive a violation of the net zero output torque condition. In contrast, the powertrain coordinates and balances torque among the plurality of torque generative devices when speeds outside of the low-speed zones 210 and 212 exist, to thereby allow the powertrain 614 to manage the state of charge (SOC) of the battery 36, perform engine stop/start events, and provide the ability for the operator to request fluctuations in engine speed. For instance, the operator requesting fluctuations in engine speed can include revving the engine when in the neutral state. The first low-speed zone 210 is utilized when the current engine operating state is an engine ON state and the second low-speed zone 212 is utilized when the current engine operating state is an engine OFF state.

The first low-speed zone 210 is bounded with respect to vehicle speed along the horizontal axis by minimum and maximum entrance thresholds 201, 203, respectively. The first low-speed zone 210 is additionally bounded with respect to engine speed along the vertical axis by the minimum engine idle speed (e.g., second horizontal line 204) and a fourth horizontal line 208. The fourth horizontal line 208 denotes a maximum engine idle speed that is selected based on a point 215 where the minimum entrance threshold 201 and the maximum uncontrolled generation limit (e.g., first dashed oriented line 205) intersect. Accordingly, the fourth horizontal line 208 extends from the point 215 to the second entrance threshold 203.

The second low-speed zone 212 is only bounded with respect to vehicle speed along the horizontal axis by the minimum and maximum entrance thresholds 201, 203, respectively. Engine speed is irrelevant with respect to the second low-speed zone 212 because the current engine operating state is the engine OFF state. The engine is un-fueled and not spinning when in the engine OFF state.

The maximum entrance threshold 203 corresponds to a first speed threshold. The minimum entrance threshold 201 is shown for illustrative purposes representing a mirrored image of the maximum entrance threshold 203 with respect to a vehicle speed of zero. Thus, if the maximum entrance threshold 203 is set to 10.5 MPH, the minimum entrance threshold 201 can be −10.5 MPH. Accordingly, vehicle speeds are indicative of one of the first and second low-speed zones 210, 212, respectively, when a magnitude of vehicle speed is less than the first speed threshold, e.g., the maximum entrance threshold 203. Alternate embodiments may include individually defining the minimum entrance threshold 201 and the maximum entrance threshold 203, wherein the thresholds are not mirrored images of one another but represent separate magnitudes from the vehicle speed of zero.

For simplicity, the minimum entrance threshold 201 illustrates a minimum speed that the vehicle must achieve in order to enter the low speed zones. For instance, an increasing vehicle speed must become greater than the minimum entrance threshold 201 in order to enter the low speed zones 210 or 212. In other words, a magnitude of a negative vehicle speed that is increasing, i.e., approaching zero, must become less than the first speed threshold, e.g., the maximum entrance threshold 203, to correspond to a vehicle speed that is indicative of one of the low-speed zones 210 and 212. In a non-limiting example, increasing vehicle speeds becoming greater than the minimum entrance threshold 201 can include situations where the vehicle momentarily coasts backward down a slanted driveway onto a flat surface, wherein the vehicle speed is increasing toward zero on the flat surface.

Likewise, the maximum entrance threshold 203 illustrates a maximum speed that the vehicle must achieve, or become less than, in order to enter the low speed zones 210 or 212. For instance, a decreasing vehicle speed must become less than the maximum entrance threshold 203 in order to enter the low speed zones 210 or 212. In a non-limiting example, decreasing vehicle speeds becoming less than the maximum entrance threshold 203 can include situations where the vehicle is driving along a flat roadway when the operator of the vehicle selects the neutral gear state via the gear selector level 6 and the vehicle begins to coast, wherein the vehicle speed is decreasing toward zero along the flat roadway while coasting.

When the vehicle speed includes a magnitude that is less than the first speed threshold (e.g., the vehicle speed is greater than the minimum entrance threshold 201 and less than the maximum entrance threshold 203), the vehicle speed is indicative of one of the first and second low-speed zones 210, 212, respectively. In one scenario, the vehicle speed is indicative of the second low-speed zone 212 when the current engine operating state includes an engine OFF state upon the magnitude of vehicle speed being less than the first speed threshold, e.g., the vehicle speed is greater than the minimum entrance threshold 201 and less than the maximum entrance threshold 203. Similarly, the vehicle speed is indicative of the first low-speed zone 210 when the current engine operating range state includes an engine ON state upon the magnitude of vehicle speed being less than the first speed threshold, e.g., the vehicle speed is greater than the minimum entrance threshold 201 and less than the maximum entrance threshold 203. A transition from the current engine operating state in either of the zones 210 and 212 is restricted. Further, motor torque output from the first electric machine 20 is limited to zero only if the current engine operating state is the engine ON state (e.g., the first low-speed zone 210. Conversely, motor torque output from the first electric machine may be utilized to maintain engine speed at zero when the current engine operating state includes the engine OFF state (e.g., the second low-speed zone 210). Accordingly, when the vehicle speed is indicative of the first low-speed zone 210, engine speed is controlled by engine torque commands using feedback between the desired engine idle speed (e.g., third horizontal line 206) and a measured engine speed.

The vehicle speed is no longer indicative of either of the low-speed zones 210, 212, respectively, when the vehicle speed includes a magnitude that is greater than a second speed threshold. A maximum exit threshold 211 corresponds to the second speed threshold. A minimum exit threshold 209 is shown for illustrative purposes and represents a mirrored image of the maximum exit threshold 211 having the same magnitude with respect to a vehicle speed of zero. Thus, if the maximum entrance threshold 211 is set to 13 MPH, the minimum exit threshold 209 can be −13 MPH. Accordingly, vehicle speeds are no longer indicative of either of the low-speed zones 210 and 212 when the magnitude of the vehicle speed is greater than the second speed threshold, e.g., greater than the maximum exit threshold 211 or less than the minimum exit threshold 209. In other words, once the vehicle speed becomes indicative of the first low-speed zone 210, a transition from the current engine operating state (e.g., engine ON state) remains restricted and motor torque output from the first electric machine 20 remains limited to zero unless the vehicle speed includes a magnitude that is greater than the second speed threshold. Similarly, once the vehicle speed becomes indicative of the second low-speed zone 212, a transition from the current engine operating state (e.g., engine OFF state) remains restricted until the vehicle speed includes a magnitude that is greater than the second speed threshold.

In one embodiment as illustrated in FIG. 2, the second speed threshold includes a larger magnitude than the first speed threshold. In this embodiment, a magnitude of vehicle speed may be greater than the first speed threshold and less than the second speed threshold, but will still remain indicative of one of the low-speed zones 210 and 212. In another embodiment, the second speed threshold includes a smaller magnitude than the first speed threshold. In this embodiment, a magnitude of vehicle speed may be less than the first speed threshold and greater than the second speed threshold, but will no longer remain indicative of one of the low-speed zones 210 and 212. Alternative embodiments may include individually defining the minimum exit threshold 209 and the maximum entrance threshold 211, wherein the thresholds are not mirrored images of one another but represent separate magnitudes from the vehicle speed of zero.

In an alternative embodiment, the second speed threshold may be omitted. In this scenario, a vehicle speed may no longer be indicative of the low speed zones 210 or 212 when the monitored vehicle speed includes a magnitude that is greater than the first speed threshold, e.g., greater than the maximum entrance threshold 203 and less than the minimum entrance threshold 201.

Figures 1, 3:
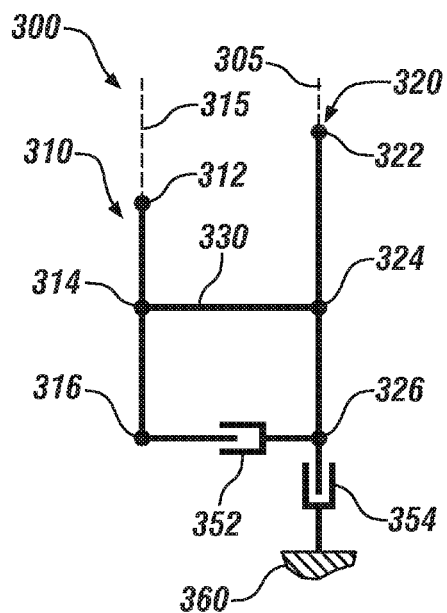
Figures 2, 3:
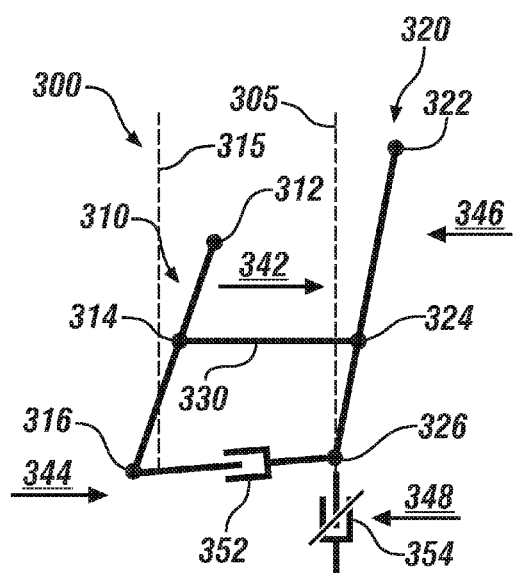
Figure 3:
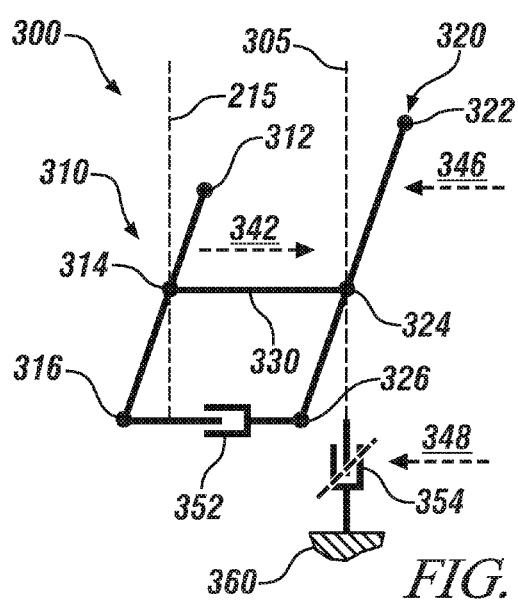
Figure 4:
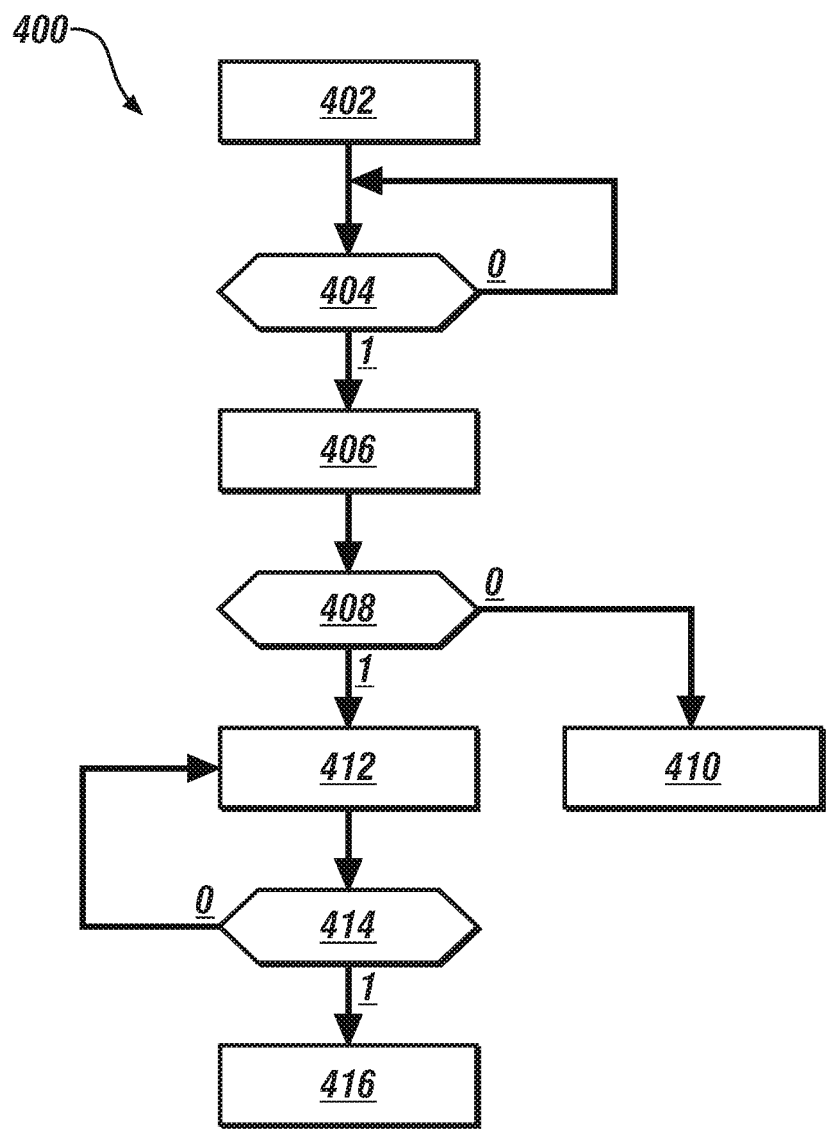
FIG. 4 illustrates a flow chart for a routine mitigating the possibility of violating a net zero output torque condition in the presence of a controlled neutral operation of the transmission of FIG. 1 being selected, in accordance with the present disclosure.

FIG. 3-1 illustrates a lever diagram for the powertrain system 610 illustrated in FIG. 1 including a portion of the transmission 300 that is configured to transfer torque between an internal combustion engine, first and second electric machines and an output member coupled to a driveline of a vehicle. The transmission 300 includes first and second planetary gear sets 310, 320, respectively, a first clutch 354, a second clutch 352 and a case ground 360. With reference to FIG. 1, the first planetary gear set 310 corresponds to the first planetary gear set 40, the second planetary gear set 320 corresponds to the second planetary gear set 50, the first clutch 354 corresponds to the first clutch 154, the second clutch 352 corresponds to the second clutch 152, and the case ground 360 corresponds to the transmission casing 24.

The first planetary gear set 310 includes a first element 316, a second element 314 and a third element 312. The first element 316 is coupled to a first electric machine and coupled to one element of the second clutch 352. The second element is coupled to a rotating shaft 330 and the third element 312 is coupled to an engine. With reference to FIG. 1, the first element 316 corresponds to the sun gear 42, the second element 314 corresponds to the carrier member 44, the third element 312 corresponds to the ring gear 48, the first electric machine corresponds to the first electric machine 20, the rotating shaft 330 corresponds to shaft 660 and the engine corresponds to the internal combustion engine 12.

Similarly, the second planetary gear set 320 includes a first element 326, a second element 324 and a third element 322. The first element 326 is coupled to the other element of the second clutch 352 and coupled to one element of the first clutch 354. Hence, the first element 326 is coupled to the first electric machine when the second clutch 352 is activated and decoupled from the first electric machine when the second clutch 352 is deactivated. The second element 324 is coupled to the rotating shaft 330 and an output member to a driveline. The output member rotates at the same speed as the rotating shaft 330. The third element 322 is coupled to the second electric machine. The other element of the first clutch 354 is coupled to the case ground 360. Hence, the first clutch 354 is a grounding clutch configured to ground the first element 326 of the first planetary gear set 320 when the first clutch 354 is activated. With reference to FIG. 1, the first element 326 corresponds to the ring gear 58, the second element 324 corresponds to the carrier member 54, the third element 322 corresponds to the sun gear 52, the second electric machine corresponds to the second electric machine 22, the output member corresponds to the output member 626 and the driveline corresponds to the driveline 700.

Rotational speeds of elements of the first planetary gear set 310 are shown in relation to a first vertical axis 315 and rotational speeds of elements of the second planetary gear set 320 are shown in relation to a second vertical axis 305. The horizontal positions of the aforementioned elements of the first and second planetary gear sets 310, 320, respectively, indicate rotational speeds thereof. As shown, the powertrain system is not operating and the rotational speeds of all the elements are zero, as indicated by their horizontal orientations relative to the first and second axes 315, 305, respectively.

FIG. 3-2 depicts the transmission 300 operating in the presence of a controlled neutral operation being selected when a monitored vehicle speed is not indicative of a low-speed zone (e.g., first or second low-speed zones 210, 212, respectively, illustrated in FIG. 2). Accordingly, engine torque 342, i.e., engine input torque provided to the transmission 300, a first motor torque 344 from the first electric machine and a second motor 346 torque from the second electric machine must be balanced to establish a net zero output torque from the transmission 300 to the driveline. The second clutch 352 is deactivated. Further, the first clutch 354 is activated (e.g., as indicated by diagonal line) and provides a reactive torque 348 to assist in establishing the net zero output torque from the transmission 300 to the driveline. Due to the balanced torques to establish the net zero output torque from the transmission to the driveline, an operator perceives the transmission as operating in neutral, without the need for the mechanically decoupling or disconnecting the transmission from the driveline. In an exemplary embodiment, the engine torque 342 is a positive engine torque, the first motor torque 344 is a positive motor torque and the second motor torque 346 is a negative motor torque. It will be appreciated that when the vehicle speed is not indicative of the low-speed zone, the operator is less likely to perceive variances from the net zero output torque condition. Thus, the powertrain 614 is permitted to maximize charging of the battery 36, perform engine stop/start events, and provide the ability for the operator to request fluctuations in engine speed.

FIG. 3-3 depicts the transmission 300 operating in the presence of a controlled neutral operation being selected when a monitored vehicle speed is indicative of a low-speed zone (e.g., either one of the first and second low-speed zones 210, 212, respectively, illustrated in FIG. 2). Accordingly, a transition from the current engine operating state is restricted. If the vehicle speed is indicative of the first slow-speed zone 210 (e.g., current engine operating state is the engine ON state) motor torque output from the first electric machine is limited to zero. If the vehicle speed is indicative of the second slow-speed zone 212 (e.g., current engine operating state is the engine OFF state) motor torque output from the first electric machine can be utilized to maintain engine speed at zero. Thus, when the monitored vehicle speed is indicative of the low-speed zone the engine latches onto the current engine operating state and is not permitted to transition until the monitored vehicle speed is no longer indicative of the low-speed zone or the transmission is shifted out of controlled neutral operation. The net-zero output torque condition is required to restrict any unintended motion of the vehicle.

As aforementioned, charging of an electrical energy storage device, e.g., battery 36, is forbidden when the monitored vehicle speed is indicative of the low-speed zone. A state of charge of the energy storage device is allowed to deplete until reaching a minimum state of charge threshold. Thus, auxiliary components are operated off of electrical energy supplied by the energy storage device until the minimum state of charge threshold is reached. A key-off event can be performed to shutdown the powertrain when the state of charge of the energy storage device depletes below the minimum state of charge threshold. Further, engine starting and stopping events are forbidden when the monitored vehicle speed is indicative of the low-speed zone. Similarly, the ability of the operator to request fluctuations in engine speed is forbidden when the monitored vehicle speed is indicative of the low-speed zone.

The second clutch 352 is always deactivated. In one embodiment, the first clutch 354 is deactivated and motor torque output from the second electric machine is limited to zero. It will be appreciated that deactivating clutches reduces electrical consumption and depletion of the electrical energy storage device allowing the powertrain to remain in controlled neutral longer. In another embodiment, the first clutch 354 is activated and provides a reactive torque 348 to assist in establishing zero output torque (e.g., the net zero output torque condition) from the transmission 300 to the driveline. The second electric machine may be operated to provide a second motor torque 346 for maintaining a substantially zero slip speed across the first clutch 354 in the presence of slip. For instance, slip of the first clutch 354 may be determined when a rotational speed between input and output components of the first clutch 354 exceed a predetermined threshold.

When the current engine operating state is an engine ON state, the powertrain utilizes the first low-speed zone 210 of FIG. 2. Accordingly, a desired engine idle speed (e.g., the third horizontal line 206) is commanded by the engine through an engine torque 342 and motor torque output from the first electric machine is limited to zero. When the current engine operating state is an engine OFF state, the powertrain utilizes the second low-speed zone 212 of FIG. 2. Accordingly, no torque is commanded by the engine and thus, it is unnecessary to limit the torque output of the first electric machine. Here, motor torque output from the first electric machine 20 may be utilized to maintain the engine speed at zero.

In an exemplary embodiment with reference to FIGS. 1, 2, 3-2 and 3-3, FIG. 4 illustrates a flow chart for a routine mitigating the possibility of violating a net zero output torque condition in the presence of a controlled neutral operation of an exemplary electro-mechanical transmission being selected. It will be appreciated that the exemplary routine can be implemented within the HCP 5 illustrated in FIG. 1. Table 1 is provided as a key to FIG. 4, wherein the numerically labeled blocks and the corresponding functions are set forth as follows.

TABLE 1

| BLOCK | BLOCK CONTENTS |
|---|---|
| 402 | Start |
| 404 | Has a controlled neutral operation of the electro-mechanical transmission been selected? |
| 406 | Monitor vehicle speed. |
| 408 | Is the monitored vehicle speed indicative of a low-speed zone? |
| 410 | Coordinate and balance torques among a plurality of torque generative devices to establish a net zero output torque condition. |
| 412 | Restrict engine operating state transitions, and if a current engine operating state includes an engine ON state, limit motor torque output from a first electric machine to zero. |
| 414 | Is a state of charge of an energy storage device less than a minimum state of charge threshold? |
| 416 | Perform a key-off event. |

The flow chart starts at block 402 and decision block 404 determines if a controlled neutral operation of the electro-mechanical transmission has been selected. The controlled neutral operation can be selected based on a user input. In an exemplary embodiment, the HCP 5 monitors an operator input to a gear selector lever 6, e.g., a PRNDL lever. A "0" indicates that the controlled neutral operation has not been selected, and the flow chart reverts back to decision block 404. A "1" indicates that the controlled neutral operation has been selected, and the flow chart proceeds to block 406.

Block 406 monitors vehicle speed. Vehicle speed is not limited to being monitored by any one method. Vehicle speed can be monitored via sensors measuring rotational velocity of one or more vehicle wheels, rotational velocity of the driveline or rotational velocity of the output member. Vehicle speed can additionally or alternatively be monitored via GPS tracking.

Decision block 408 determines if the monitored vehicle speed is indicative of a low-speed zone. The low-speed zone can refer to either one of the first and second low-speed zones 210, 212, respectively, of FIG. 2, depending on what the current engine operating state is when the controlled neutral operation has been selected. In an exemplary embodiment, vehicle speeds are permitted to enter and become indicative of the low-speed zone when the monitored vehicle speed includes a magnitude that is less than the first speed threshold (e.g., maximum entrance threshold 203). In contrast, vehicle speeds may only be permitted to exit, and no longer be indicative of the low-speed zone, when the monitored vehicle speed includes a magnitude that is greater than a second speed threshold (e.g., maximum exit threshold 211). A "0" indicates that the vehicle speed is not indicative of the low speed zone, and the flow chart proceeds to block 410. A "0" also indicates that a vehicle speed that was indicative of the low speed zone in previous iteration, is no longer indicative of the low-speed zone in the current iteration, and the flow chart proceeds to block 410. A "1" indicates that the vehicle speed is indicative of the low-speed zone, and the flow chart proceeds to block 412.

Referring to block 410, torque commands among the plurality of torque generative devices including the engine 12 and the first and second electric machines 20, 22, respectively, are coordinated and balanced in order to establish the net zero output torque condition. It is understood that that operator is less likely to perceive a violation of the net zero output torque condition when the vehicle speed is not indicative of the low-speed zone. Accordingly, functions such as engine starting/stopping events, providing the operator the ability to request fluctuations in engine speed, and charging of the battery 36 (i.e., energy storage device) can be advantageously performed.

Referring to block 412, a transition from a current engine operating state is restricted. When the current engine operating state includes the engine ON state (e.g., first low-speed zone 210), motor torque output from the first electric machine 20 is limited to zero. Requiring the engine 12 to latch onto the current engine operating state (and limiting the motor torque output from the first electric machine 20 to zero when in the engine ON state) mitigates the possibility of violating the net zero output torque condition by eliminating the risk of unintended torque flow to the driveline. As aforementioned, the possibility of violating the net zero output torque condition may result due to a miss-production of torque distributed to the transmission when sources of error in the generation of torque from either of the electric machines 20 and 22 exist due to de-magnetization, part-to-part variation, and a class of anomalies in the electric machines. When the vehicle speed is indicative of the low-speed zone, the aforementioned functions such as engine starting/stopping events, providing the operator the ability to request fluctuations in engine speed, and charging of the battery 36 (i.e., energy storage device) are forbidden.

When the current engine operating state includes the engine ON state, the engine is restricted from transitioning to the engine OFF state and is operated at a desired engine idle speed (e.g., third horizontal line 206). Here, the motor torque output from the first electric machine 20 is limited to zero to prevent the motor and engine from providing a net torque to the driveline. When the current engine operating state includes the engine OFF state, the engine is restricted from transitioning to the engine ON state. Here, the torque output of the first electric machine is not limited to zero as there is no need to do so, since there is no risk of a torque imbalance resulting in output torque. Output torque from the first electric machine 20, may however, be utilized to maintain engine speed at zero when the current engine operating state includes the engine OFF state.

In one embodiment, motor torque output from the second electric machine 22 is limited to zero. In another embodiment, motor torque output from the second electric machine 22 is permitted to provide a motor torque for maintaining a substantially zero slip speed across the first clutch 54. The second clutch 52 is always deactivated when the vehicle speed is indicative of the low-speed zone.

Decision block 414 determines if a state of charge of an energy storage device, e.g., the battery 36, is less than a minimum state of charge threshold. The energy storage device is permitted to power auxiliary components of the vehicle while in controlled neutral operation. The state of charge of the energy storage devices is allowed to deplete until reaching the minimum state of charge threshold. The minimum state of charge threshold can be a minimum magnitude of charge required by the energy storage device to perform an engine start event. A "0" indicates the state of charge is not less than the minimum state of charge threshold, and the flow chart reverts back to block 412. A "1" indicates the state of charge is less than the minimum state of charge threshold, and the flow chart proceeds to block 416. At block 416, a key-off event is performed to shutdown the powertrain.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a powertrain system comprising an internal combustion engine, a first electric machine and an electro-mechanical transmission operative to transmit torque to a driveline, the method comprising:
   in the presence of a controlled neutral operation of the electro-mechanical transmission being selected:
   monitoring vehicle speed; and
   only when the monitored vehicle speed is indicative of a low-speed zone, restricting a transition from a current engine operating state.

2. The method of claim 1, wherein restricting the transition from the current engine operating state comprises:
   limiting motor torque output from the first electric machine to zero only when the current engine operating state comprises an engine ON state.

3. The method of claim 2, wherein the engine is operated at a desired engine idle speed.

4. The method of claim 1, wherein restricting the transition from the current engine operating state comprises:
   utilizing motor torque output from the first electric machine to maintain engine speed at zero when the current engine operating state comprises an engine OFF state.

5. The method of claim 1, wherein the vehicle speed becomes indicative of the low-speed zone when the monitored vehicle speed comprises a magnitude that is less than a first speed threshold.

6. The method of claim 5, wherein the vehicle speed is no longer indicative of the low-speed zone when the monitored vehicle speed comprises a magnitude that is greater than a second speed threshold.

7. The method of claim 1, further comprising:
   limiting motor torque output from a second electric machine to zero when the monitored vehicle speed is indicative of the low-speed zone.

8. The method of claim 1, further comprising:
   when the monitored vehicle speed is indicative of the low-speed zone:
   monitoring a state of charge of an energy storage device;
   allowing the state of charge of the energy storage device to deplete until reaching a minimum state of charge threshold; and
   performing a key-off event when the state of charge of the energy storage device depletes below the minimum state of charge threshold.

9. The method of claim 1 further comprising:
   forbidding engine starting and stopping events when the monitored vehicle speed is indicative of the low-speed zone.

10. The method of claim 1 further comprising:
   forbidding charging of an energy storage device when the monitored vehicle speed is indicative of the low-speed zone.

11. The method of claim 1 further comprising:
forbidding an ability for the operator to request fluctuations in engine speed when the monitored vehicle speed is indicative of the low-speed zone.

12. The method of claim 1 further comprising:
coordinating torque commands between the engine and the first electric machine to establish a net zero output torque condition when the monitored vehicle speed is not indicative of the low-speed zone.

13. An apparatus for controlling a powertrain system including an electro-mechanical transmission of a vehicle in the presence of a controlled neutral operation comprising:
an internal combustion engine;
first and second electric machines;
an energy storage device;
an electro-mechanical transmission mechanically-operatively coupled to the internal combustion engine and the first and second electric machines adapted to transmit mechanical power to an output member that reacts with a driveline, the electro-mechanical transmission comprising:
first and second planetary gear sets each including a first element, a second element, and a third element,
a first clutch having one element coupled to the first element of the second planetary gear set and the other element coupled to a case ground, and
a second clutch having one element coupled to the first element of the first planetary gear set and the other element coupled to the first element of the second planetary gear set; and
a control module
monitoring vehicle speed, and
only when the monitored vehicle speed is indicative of a low-speed zone, restricting a transition from a current engine operating state.

14. The apparatus of claim 13, wherein restricting the transition from the current engine operating state comprises limiting motor torque output from the first electric machine to zero when the current engine operating state includes an engine ON state.

15. The apparatus of claim 13, wherein monitored vehicle speed becomes indicative of the low-speed zone when the vehicle speed is greater than a minimum entrance threshold and less than a maximum entrance threshold.

16. The apparatus of claim 15, wherein monitored vehicle speed remains indicative of the low-speed zone when the vehicle speed is greater than a minimum exit threshold and less than a maximum exit threshold.

17. The apparatus of claim 13, wherein the second clutch is always deactivated to decouple the first element of the second planetary gear set from the first electric machine when the monitored vehicle speed is indicative of the low-speed zone.

18. The apparatus of claim 13, wherein the first clutch is one of:
activated to ground the first element of the second planetary gear set when the monitored vehicle speed is indicative of the low-speed zone, the first clutch providing a reactive torque to assist in establishing zero output torque from the transmission to the driveline; and
deactivated to un-ground the first element of the second planetary gear set when the monitored vehicle speed is indicative of the low-speed zone.

19. The apparatus of claim 13, wherein the second electric machine provides a motor torque for maintaining a substantially zero slip speed across the first clutch.

20. The apparatus of claim 13, further comprising the control module:
monitoring a state of charge of the energy storage device;
when the monitored vehicle speed is indicative of the low-speed zone, allowing the state of charge of the energy storage device to deplete until reaching a minimum state of charge threshold; and
performing a key-off event when the state of charge of the energy storage device depletes below the minimum state of charge threshold.

\* \* \* \* \*